(12) United States Patent
Akita et al.

(10) Patent No.: US 10,488,858 B2
(45) Date of Patent: Nov. 26, 2019

(54) REMOTE CONTROL APPARATUS AND REMOTE CONTROL SYSTEM UTILIZING THE APPARATUS

(71) Applicant: DENSO CORPORATION, Kariya, Aichi-pref. (JP)

(72) Inventors: Hidenori Akita, Chiryu (JP); Takuma Kyo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 688 days.

(21) Appl. No.: 14/802,163

(22) Filed: Jul. 17, 2015

(65) Prior Publication Data

US 2016/0018821 A1    Jan. 21, 2016

(30) Foreign Application Priority Data

Jul. 18, 2014    (JP) .................................. 2014-148158

(51) Int. Cl.
    *G05D 1/00*      (2006.01)
    *B60W 30/00*     (2006.01)
    *B60W 30/10*     (2006.01)

(52) U.S. Cl.
    CPC .......... *G05D 1/0022* (2013.01); *B60W 30/00* (2013.01); *B60W 30/10* (2013.01); *B60W 2550/14* (2013.01); *B60W 2550/142* (2013.01); *B60W 2550/402* (2013.01); *B60W 2550/404* (2013.01); *B60W 2550/406* (2013.01); *B60W 2550/408* (2013.01); *G05D 2201/0213* (2013.01)

(58) Field of Classification Search
    None
    See application file for complete search history.

(56) References Cited

U.S. PATENT DOCUMENTS

| 6,604,038 | B1 * | 8/2003 | Lesesky | ................. | G07C 5/008 340/988 |
| 7,109,843 | B2 * | 9/2006 | Nagai | ................. | B60R 25/2072 307/10.5 |
| 2004/0085189 | A1 * | 5/2004 | Nagai | ................. | B60R 25/2072 340/5.72 |
| 2005/0016787 | A1 * | 1/2005 | Lesesky | ................. | G07C 5/008 180/311 |
| 2006/0213731 | A1 * | 9/2006 | Lesesky | ................. | G07C 5/008 188/158 |
| 2008/0218323 | A1 * | 9/2008 | Lesesky | ................. | G07C 5/008 340/431 |

(Continued)

FOREIGN PATENT DOCUMENTS

| CA | 2549680 A1 * 12/2007 | ........... H04L 5/1438 |
| JP | H04-140934 5/1992 | |

(Continued)

*Primary Examiner* — Shelley Chen
(74) *Attorney, Agent, or Firm* — Knobbe, Martens, Olson & Bear, LLP

(57) ABSTRACT

A remote control apparatus uses wireless communication to control driving of a control object such as a vehicle. When the drive condition is changing, as when the vehicle is being steered to follow a curve in a travel route, while also the vehicle speed exceeds a specified threshold value, processing is executed for reducing a communication delay between the remote control apparatus and the control object, to thereby ensure sufficient speed of control response.

17 Claims, 11 Drawing Sheets

(56) References Cited

U.S. PATENT DOCUMENTS

| | | | | |
|---|---|---|---|---|
| 2009/0018712 A1* | 1/2009 | Duncan | ................ | G09B 19/167 |
| | | | | 701/2 |
| 2013/0073506 A1* | 3/2013 | Camp | ................... | H04W 4/029 |
| | | | | 706/46 |
| 2015/0257058 A1* | 9/2015 | Tanino | ............ | H04W 36/00837 |
| | | | | 370/331 |

FOREIGN PATENT DOCUMENTS

| | | |
|---|---|---|
| JP | 2000-174770 | 6/2000 |
| JP | 2013-251914 | 12/2013 |
| JP | 5393240 | 1/2014 |
| JP | 2014-049977 | 3/2014 |

\* cited by examiner

FIG.21

TABLE 1

| MCS INDEX | MODULATION ORDER | TBS INDEX | REDUNDANCY VERSION |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | RESERVED | | 1 |
| 30 | RESERVED | | 2 |
| 31 | RESERVED | | 3 |

REMOTE CONTROL APPARATUS AND REMOTE CONTROL SYSTEM UTILIZING THE APPARATUS

CROSS-REFERENCE TO RELATED APPLICATIONS

This application is based on and incorporates herein by reference Japanese Patent First Application No. 2014-148158 filed on Jul. 18, 2014.

BACKGROUND OF THE INVENTION

Field of Application

The present invention relates to technology for remote control of a control object, using wireless communication.

Description of Related Art

Technology is known for employing wireless communication in remote control of a control object, for example as described in Japanese patent publication No. 5393240, designated in the following as reference 1. With the technology of reference document 1, image data are captured and transmitted through wireless communication by a control object (a mobile object such as a vehicle) and received by a remote operation apparatus and displayed by a display section of that apparatus. An operator of the remote operation apparatus performs remote control of the control object through wireless communication, based upon the images displayed by the display section.

Such remote control may become difficult when there is a communication delay, in particular, a reception delay. In the case of reference document 1, the reception delay is the delay between the time when an information item is transmitted by the control object and the time when the item is displayed to the operator of the remote control apparatus. With the technology of reference document 1, image data received from a control object are temporarily stored in a buffer memory before being displayed by the display section. The buffer memory is used to adjust a total delay time (the sum of the reception delay time and a delay caused by temporary storage in the buffer memory). Specifically, the delay due to temporary storage in the buffer memory is adjusted such as to maintain the total delay time at a constant value, or such that the total delay time varies only gradually. In that way, abrupt variations in the image data displayed by the display section can be reduced.

However, although the technology described in reference document 1 enables variations in the displayed image data to be made more gradual, by rendering the total delay time constant or by ensuring that the total delay time varies only gradually, it has the disadvantage of making the total delay time greater than the reception delay time. This is a problem of such prior art technology, since a sufficient speed of control response is difficult to achieve.

In particular when the drive condition of the control object is changing (e.g., a direction of motion of the control object is being changed to a required direction by remote control), the communication delay may prevent accurate control.

SUMMARY OF THE INVENTION

Hence it is desired to overcome the above problem, by providing a remote control apparatus for controlling a control object through wireless communication, whereby a sufficiently high speed of control response is ensured at all times. To achieve this, when a drive condition of a control object is changing and the speed of control response (determined by the magnitude of a communication delay) thereby becomes insufficient, the remote control apparatus executes processing referred to in the following description and in the appended claims as "handling processing" for reducing the communication delay.

The remote control apparatus may be configured to execute the handling processing when it is judged that the drive condition of a control object is changing while also a motion speed of the control object exceeds a specific threshold value. For example when the control object is a vehicle and has entered a curved part of a route, the drive condition of the vehicle changes, since steering control must be applied for changing the advancement direction of the vehicle in accordance with shape of the route. Similarly (if torque control is applied) when the vehicle enters a part of the route where the gradient varies, the drive torque produced by the vehicle must be changed accordingly. In such cases, a higher speed of response is required for the remote control than when the vehicle is traveling along a straight and level part of the route. Hence, a higher threshold value of speed is set when the drive condition of the control object is changing.

From another aspect, the remote control apparatus may be configured to execute the handling processing when it is judged that the drive condition of a control object is changing while also a communication delay between the remote control apparatus and the control object exceeds a predetermined allowable range.

The communication delay may be calculated based on the level of communication quality obtained when the control object transmits information to the remote control apparatus, i.e., lowering of the communication quality will result in an increase of the communication delay. The communication quality may be evaluated based on the reception signal power value (value of power of a signal received by the remote control apparatus, transmitted from the control object), for example.

From another aspect, when the control object is a vehicle which travels over a predetermined route, the handling processing for reducing the communication delay is executed after the vehicle has traveled the entire route, and has thereby acquired and stored information which expresses reception signal power values obtained at various positions on the route where the communication delay may be excessive. In that case, the handling processing can consist of specifying respective locations on the route at which receiving antennas are required to be installed, for increasing the communication quality (by increasing the reception signal power) and thereby reducing the communication delay when the vehicle subsequently traverses these locations.

From another aspect, when the control object can transmit information by wireless communication using one or more of a plurality of communication channels, the handling processing may be executed while the control object is being driven (e.g., while a controlled vehicle is traveling along a route) and consists of commanding the control object to increase the number of communication channels being used, that is, to change from transmission of the information via a single communication channel to multiplexed transmission of the information via a plurality of communication channels. The communication quality at the remote control apparatus can thereby be increased, thus reducing the communication delay.

From another aspect, the handling processing may consist of commanding the control object to increase the power of a transmission signal used by the control object for wireless communication with the remote control apparatus, at times when it is judged that the communication delay must be reduced. The reception signal power at the remote control apparatus can thereby be increased, thus reducing the communication delay.

From another aspect, applicable to a case in which the control object utilizes a MCS (Modulation and Coding Scheme) index value in determining a modulation method and encoding factor which are applied when transmitting information to the remote control apparatus, the handling processing can consist of commanding the control object to decrease the MCS index value that is currently being applied. The communication quality can thereby be increased, and the communication delay accordingly reduced.

BRIEF DESCRIPTION OF THE DRAWINGS

FIG. 21 is a table of MCS index values used with the second and sixth embodiments.

DESCRIPTION OF PREFERRED EMBODIMENTS

[1. First Embodiment]
[1-1. Configuration]

Figure 1:
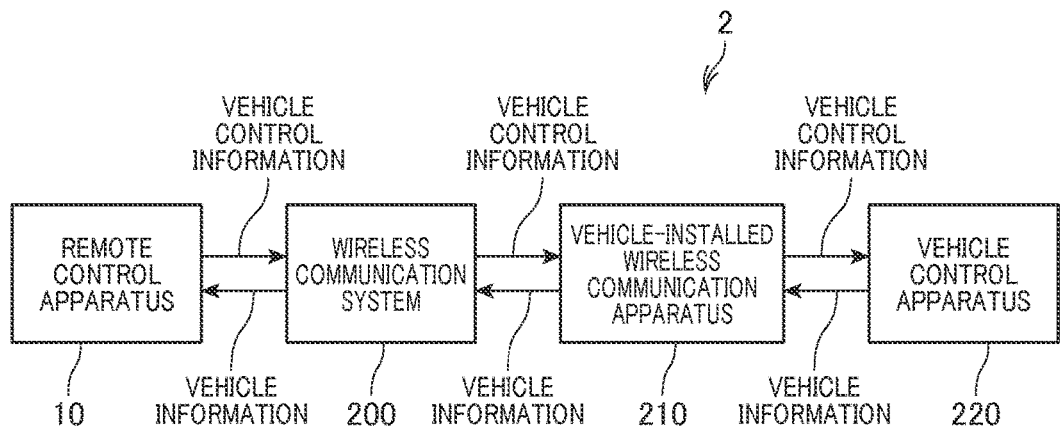
FIG. 1 is a block diagram of a remote control system incorporating a first embodiment of a remote control apparatus.
Figure 2:
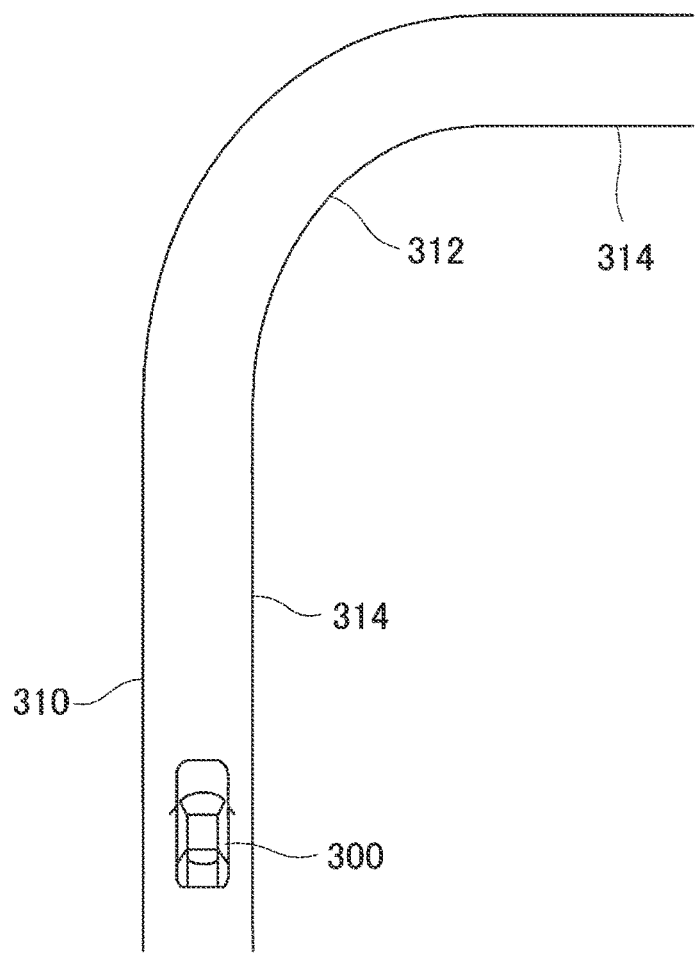
FIG. 2 is a conceptual diagram of a route of a vehicle.

FIG. 1 is a block diagram showing the overall configuration of a first embodiment of a remote control system 2, which incorporates a remote control apparatus 10 connected to a wireless communication system 200, and a vehicle-installed wireless communication apparatus 210 and vehicle control apparatus 220 which are carried by a vehicle 300 shown in FIG. 2.

Control functions of the remote control apparatus 10 are performed by a computer in executing a remote control program that has been stored beforehand in a memory. The remote control apparatus 10 is installed at a central facility (remote control center), and performs remote control of the vehicle 300, which travels along a predetermined route 310. The remote control is performed using wireless communication between the remote control apparatus 10 and the vehicle 300.

The remote control apparatus 10 receives vehicle information transmitted from the vehicle 300, expressing the current position, advancement direction, speed, etc., of the vehicle 300, and transmits vehicle control information to the vehicle control apparatus 220. The vehicle control information expresses command values of steering angle, speed, etc., for the vehicle 300.

The wireless communication system 200 consists of a transmitting/receiving antenna, transmitting/receiving apparatus, Internet connection (interface), etc. The vehicle-installed wireless communication apparatus 210 is a transmitting/receiving apparatus which executes wireless communication with the wireless communication system 200.

Figure 3:
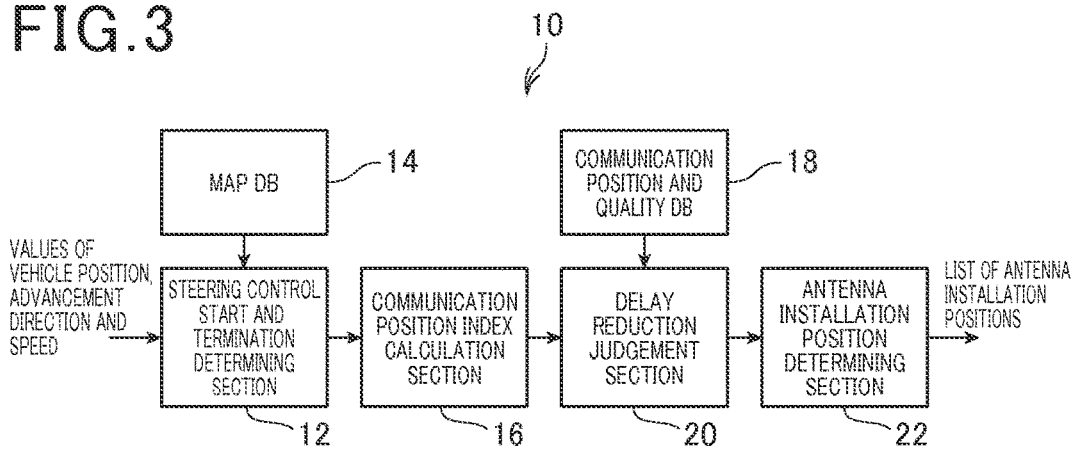
FIG. 3 is a block diagram for describing the remote control apparatus of the first embodiment.

The vehicle control apparatus 220 controls the engine, brakes, etc., of the vehicle 300 based on the vehicle control information transmitted from the remote control apparatus 10, The functions executed by the remote control apparatus 10 with respect to reducing a communication delay are shown conceptually in the block diagram of FIG. 3. As shown, this consists of a steering control start and termination determining section 12, a map database 14, a communication position index calculation section 16, a communication position and quality database 18, a delay reduction judgement section 20 and an antenna installation position determining section 22. The map database 14 has information stored therein beforehand, expressing the form of the route 310.

The steering control start and termination determining section 12 acquires the vehicle information transmitted from the vehicle 300, and uses the acquired vehicle information and the contents of the map database 14 to obtain the shape of the part of the route 310 where the vehicle 300 is currently positioned.

When the vehicle 300 is as shown in the example of FIG. 2, the steering control start and termination determining section 12 detects, based on the position and advancement direction of the vehicle 300 on the route 310 and on the shape of the route 310, that the vehicle 300 is about to enter a curved part 312 of the route. The steering control start and termination determining section 12 thereby determines the times at which a steering control operation (for controlling the advancement direction of the vehicle 300 to travel around a curved part 312 of the route 310) is to commence and to terminate. When the vehicle 300 enters such a curved part of the route 310, the drive condition of the vehicle 300 changes, since the advancement direction of the vehicle 300 must be successively changed in accordance with variations in the shape of that part of the route.

The expression "drive condition (of a control object) is changing", as used in describing this and subsequent embodiments and in the appended claims, is to be understood as follows. It signifies that one or more control parameters of the control object (motion speed, advancement direction, etc.) is being altered, as opposed to a condition in which an existing state of control can be left unchanged (e.g., as for a vehicle that is currently traveling along a straight and level part of a route).

When the vehicle 300 leaves a straight part 314 of the route 310 to enter a curved part 312, the steering control start and termination determining section 12 sets a steering control flag (flag bit) in the on state, and resets the steering control flag to the off state when the vehicle 300 exits from the curve part 312 to enter a straight part 314. Hence, while the steering control flag is on, this indicates that the drive condition of the vehicle 300 is changing, as steering control is being applied by the remote control apparatus 10.

It should be noted that it would be possible to arrange that the steering control flag is set to the on state immediately before the vehicle 300 enters a curved part 312 of the route, and immediately before entering a straight part 314 from a curved part 312.

When the vehicle 300 is traveling with the steering control flag in the on state, the communication position index calculation section 16 calculates a threshold value of speed of the vehicle 300, as an index for use in judging whether it is necessary to reduce the communication delay. The threshold value of speed is calculated based on the shape of the part of the route 310 where the vehicle 300 is currently traveling. As described hereinabove, "communication delay" here signifies a delay in upstream communication, that is, a delay before information transmitted by the control object becomes available to the remote control apparatus 10 for control purposes.

When the vehicle 300 is driving along a straight part 314 of the route 310, no change is required in its advancement direction, so that remote control can be performed with the control condition left unchanged, even if the vehicle 300 is traveling at high speed. In that condition, even if there is a communication delay, the vehicle 300 will continue to travel in a straight line.

However when the vehicle 300 has entered a curved part 312 of the route 310, the remote control apparatus 10 transmits steering control commands for successively changing the advancement direction of the vehicle 300. In that case if there is a delay before vehicle information transmitted from the vehicle 300 is received by the remote control apparatus 10, with a resultant delay in transmitting control commands from the remote control apparatus 10 based on the vehicle information, and the vehicle 300 is traveling at a high speed, it will be difficult for the remote control apparatus 10 to accurately control the vehicle 300 in accordance with the shape of the route 310.

Hence when the vehicle 300 is traveling along a curved part 312, a lower threshold value of speed is set than when the vehicle 300 is driving along a straight part 314 of the route 310.

At the times when the vehicle 300 is exiting from a curved part 312 into a straight part 314, or is exiting from a straight part 314 into a curved part 312, an especially high speed of control response is required. Hence at such times it is desirable to set an especially low threshold value of speed.

With this embodiment, positions for installing receiving antennas (connected to the wireless communication system 200), for reducing communication delay where necessary, are determined as follows. When the vehicle 300 is traveling along a part of the route 310 where the steering control flag is set to the on state, while also the actual speed of the vehicle 300 is higher than the threshold value, the communication position index calculation section 16 sets a flag referred to as the "communication delay reduction" flag to the on state. As the vehicle 300 travels along the route 310, the positions of respective parts of the route 310 where the communication delay reduction flag is set to the on state are successively stored in the communication position and quality database 18, together with values of reception signal power obtained at these positions.

Here, "reception signal power" signifies a detected level of power of a signal received by the wireless communication system 200 from the vehicle 300. The reception signal power value is used as a measure of communication quality with respect to upstream transmission (transmission of information from the vehicle 300 to the remote control apparatus 10). A high value of reception signal power signifies that the communication delay will be short, since the communication quality will be high, while a low value of reception signal power signifies that the communication delay will be long, since the communication quality will be low.

After the vehicle 300 has traveled the route 310 and the above-described information has thereby been acquired and stored in the communication position and quality database 18, the information is analyzed by the delay reduction judgement section 20. Specifically, the delay reduction judgement section 20 identifies each part of the route 310 where the communication delay reduction flag was in the on state while also the reception signal power was below a required value, and hence where the communication delay is required to be reduced.

The results obtained by the delay reduction judgement section 20 are supplied to the antenna installation position determining section 22, which determines locations for installing respective receiving antennas (each connected to the wireless communication system 200) for receiving signals transmitted from the vehicle 300, at each of the parts of the route 310 where the communication delay is required to be reduced.

The positions where the receiving antennas are to be installed are recorded in a list by the antenna installation position determining section 22.

[1-2. Processing]

Figure 4:
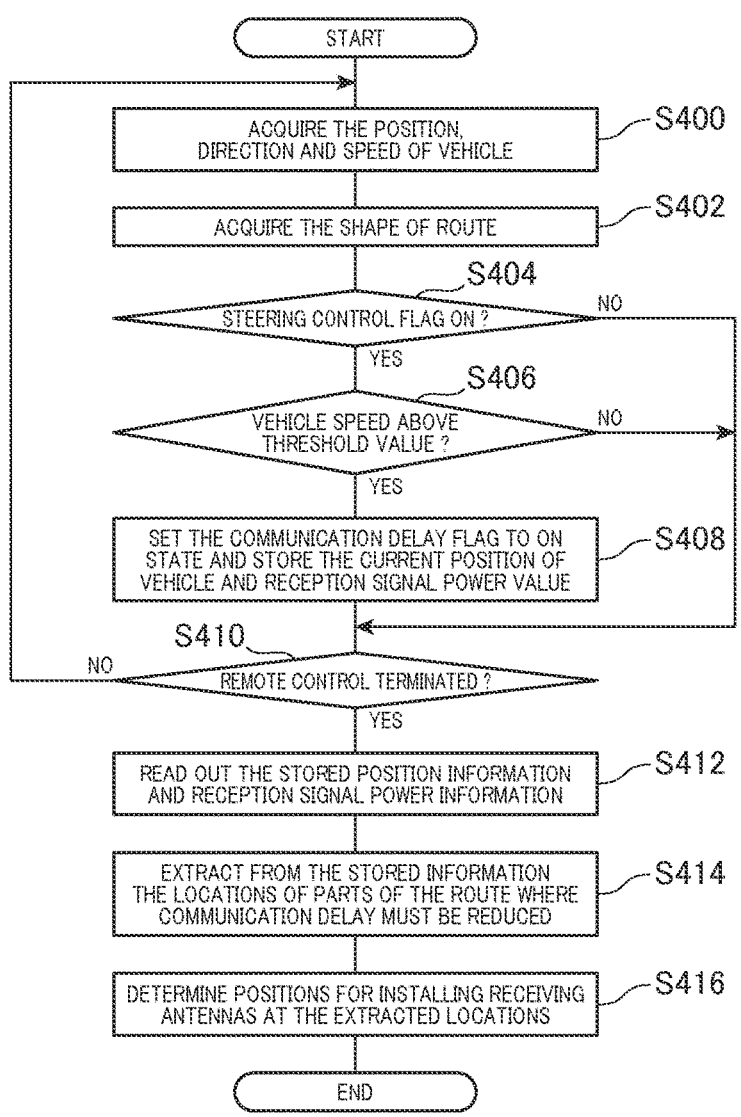
FIG. 4 is a flow diagram of remote control processing executed with the first embodiment.

FIG. 4 is a flow diagram of processing executed by the remote control apparatus 10 of this embodiment, for determining positions at which receiving antennas are required to be installed. Firstly (step S400) when the vehicle 300 commences travel along the route 310, the remote control apparatus 10 acquires the vehicle information transmitted from the vehicle 300 (current position, advancement direction, speed, etc.).

Next (step S402), information is obtained expressing the shape of the part of the route 310 where the vehicle 300 is currently traveling, based on the contents of the map database 14 and the acquired vehicle information.

A decision is then made (step S404) as to whether the steering control flag is set in the on state. If the steering control flag is off, indicating that the vehicle 300 is traveling along a straight part 314 of the route 310 (NO decision in step S404) step S410 is then executed.

If the steering control flag is on (YES decision in step S404) indicating that the vehicle 300 is traveling along a curved part of the route, so that the drive condition is changing, as decision is made (step S406) as to whether the speed of the vehicle 300 exceeds the threshold value.

The speed threshold value is calculated (prior to executing step S406) based on the shape of the part of the route 310 where the vehicle 300 is currently positioned, as determined in step S402.

If the speed does not exceed the threshold value (NO decision in step S406), step S410 is then executed.

If the vehicle speed exceeds the threshold value (YES in step S406) the communication delay reduction flag is set to the on state, and the current position of the vehicle 300 is stored (as a candidate delay-reduction position) together with the current value of reception signal power (step S408). More specifically, a "candidate delay-reduction position" is the start position of a part of the route 310 where delay reduction may be required. Step S410 is then executed.

In step S410 the remote control apparatus 10 judges whether travel of the vehicle 300 along the route 310 has ended, so that remote control of the vehicle 300 is ended. The judgement is made based on the vehicle position information and on the contents of the map database 14. If the remote control is not ended at this time (NO decision in step S410), step S400 is then repeated. The processing of steps S400 to S408 is thereby repetitively executed.

If the remote control is ended (YES decision in step S410) the stored candidate delay-reduction position information and reception signal power information are read out (step S412).

The remote control apparatus 10 then (step S414) analyzes the information to extract the positions of respective parts of the route 310 where the communication delay reduction flag was set in the on state and the reception signal power value was below a predetermined value, thereby preventing reliable communication of information from the control object to the remote control apparatus.

Based on the information obtained in step S414, the remote control apparatus 10 determines positions at which receiving antennas (connected to the wireless communication system 200) are required to be installed along the route 310, for reducing the communication delays sufficiently (i.e., by increasing the reception signal power values where necessary), and registers the installation positions in a list (step S416).

Although not shown in FIG. 4, the communication delay reduction flag is reset to the off state when there is a NO decision in step S406, or when there is a NO decision in step S404 (i.e., when the vehicle 300 exits from a curved part of the route 310, so that the steering control flag is reset to the off state).

[1-3. Effects]

With the first embodiment described above, the remote control apparatus 10 identifies those parts of the route 310 where it is necessary to reduce the communication delay with respect to upstream transmission of information (from the vehicle 300 to the remote control apparatus 10), and determines suitable positions for installing receiving antennas at these parts of the route. The communication delay can thereby be held below a predetermined maximum allowable value throughout the entire route 310. This enables the remote control apparatus 10 to appropriately control the vehicle 300 through wireless communication while the vehicle 300 is moving along the route 310 in a changing drive condition.

With this embodiment, the determination of positions for installing receiving antennas constitutes handling processing that is executed by the remote control apparatus 10 for reducing a communication delay.

[2. Second Embodiment]

[2-1. Points of Difference from First Embodiment]

The following description of a second embodiment is centered on points of difference from the first embodiment, with description of features common to the first embodiment being omitted.

Figure 5:
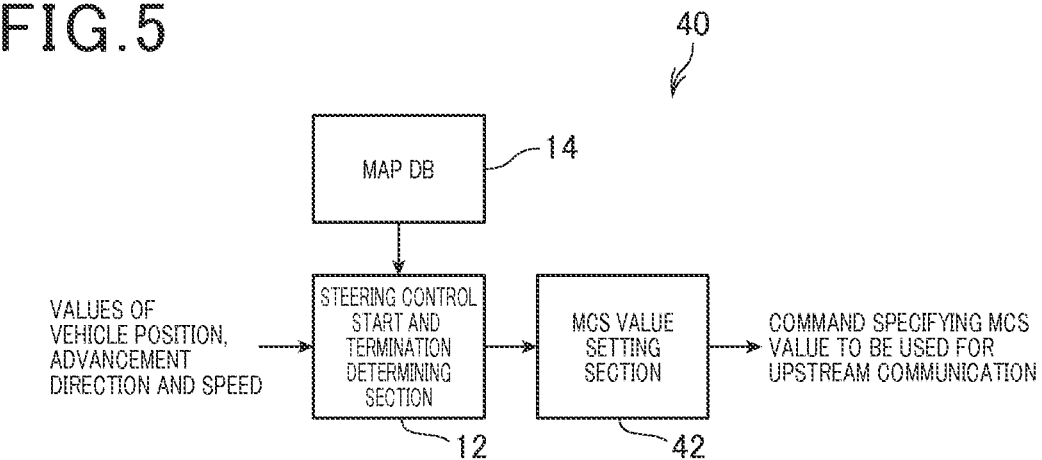
FIG. 5 is a block diagram for describing a remote control apparatus of a second embodiment.

The functions executed by a remote control apparatus 40 of the second embodiment are shown conceptually in the block diagram of FIG. 5. With the first embodiment, while the vehicle 300 is traveling along the route 310, the remote control apparatus 10 identifies those positions on the route at which the communication delay may be excessive, and stores corresponding information. After the vehicle 300 has completed driving along the route 310, the remote control apparatus 10 uses the stored information to determine positions where receiving antennas are to be installed for reducing the communication delay. With the second embodiment the remote control apparatus 40 executes processing for reducing the communication delay, at each position where such reduction is required, while the vehicle 300 is traveling along the route 310. This is an essential point of difference between the first and second embodiments.

As shown in FIG. 5 the remote control apparatus 40 is made up of a MCS (Modulation and Coding Scheme) setting section 42, in addition to the map database 14 and steering control start and termination determining section 12. The MCS value setting section receives output information from the steering control start and termination determining section 12. The MCS value setting section transmits commands to the vehicle 300 specifying an MCS index value that is to be used by the vehicle 300, with the value being determined based on the speed and position of the vehicle 300 on the route 310 at that time.

[2-2. Processing]

Figure 6:
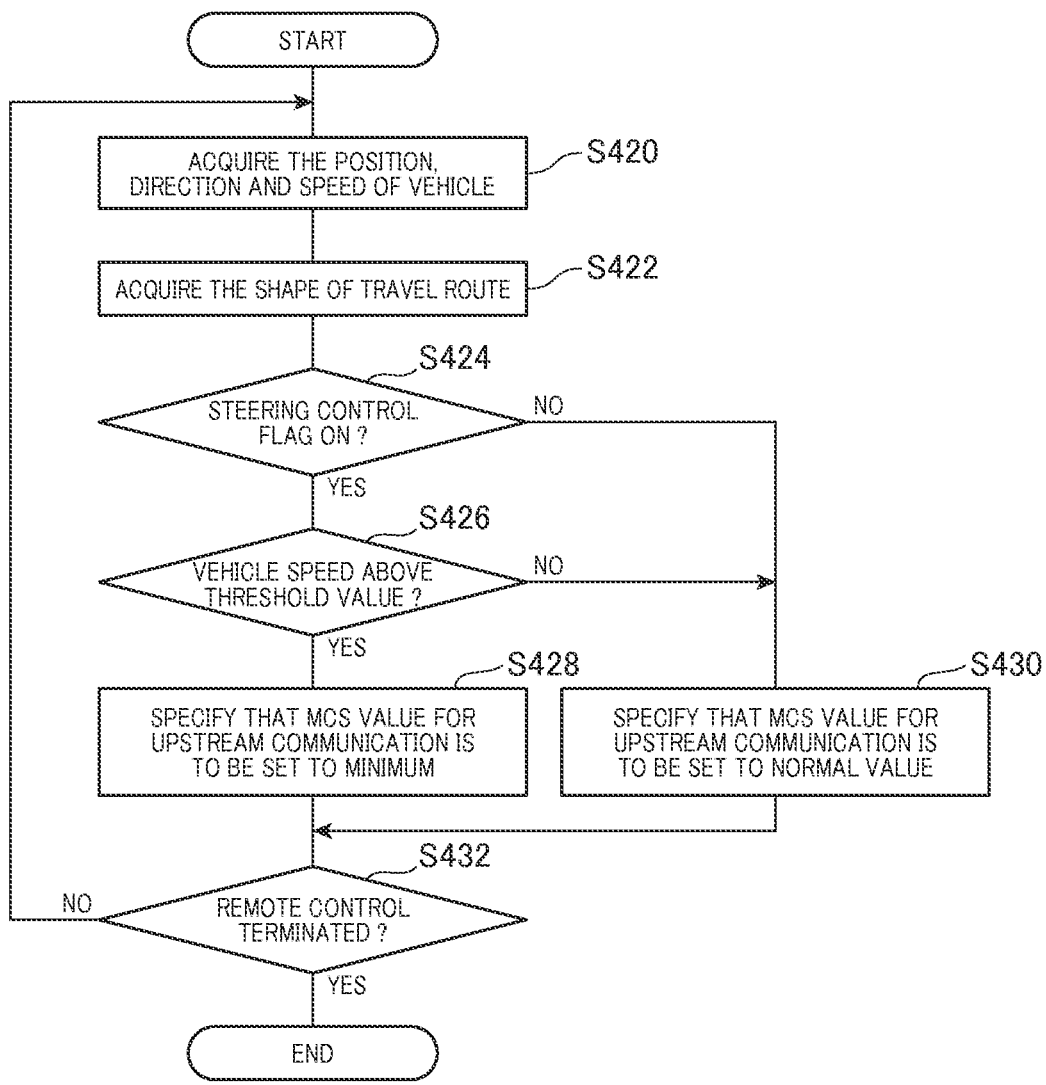
FIG. 6 is a flow diagram of remote control processing executed with the second embodiment.

The remote control processing executed by the remote control apparatus 40 will be described referring to the flow diagram of FIG. 6. In FIG. 6, steps S420, S422 and S432 are respectively identical to steps S400, S402 and S410 in FIG. 4 of the first embodiment, so that description is omitted.

If the steering control flag is set off (NO decision in step S424), the remote control apparatus 40 judges that it is not necessary to reduce the communication delay, and step S430 is then executed. If the steering control flag is set on (YES decision in step S424), a decision is made as to whether the vehicle speed exceeds the threshold value (step S426).

If the vehicle speed exceeds the threshold value (YES decision in step S426), the remote control apparatus 40 judges that (at the position where the vehicle is currently traveling) it is necessary to reduce the communication delay, and step S428 is then executed. In step S428, the remote control apparatus 40 commands the vehicle 300 to change the MCS index value to the smallest one of a list of MCS index values. These values are shown in Table 1 of FIG. 21. The MCS value determines a modulation method and encoding factor which are used by the wireless communication apparatus 210 of the vehicle 300 when transmitting data to the remote control apparatus 40. Table 1 is an example of a MCS table established by the 3GPP ($3^d$ Generation Partnership Project). The smaller the MCS index value, the shorter can be the communication delay Step S432 is then executed, in which a decision is made as to whether remote control of the vehicle 300 is ended. If the remote control is not ended, the processing of steps S420 to S430 is repeated.

If the vehicle speed is not above the threshold value (NO decision in step S426), it is judged that it is not necessary to reduce the communication delay, and step S430 is then executed.

In step S430, the remote control apparatus 40 commands the vehicle 300 to change to (or maintain) a normally used MCS index value, and step S432 is then executed.

[2-3. Effects]

With the second embodiment described above, while the vehicle 300 is being driven, when the vehicle 300 reaches a position where the drive condition is changing and it is necessary to reduce the communication delay (in view of the vehicle speed and position at that time), the remote control apparatus commands the vehicle 300 to set the MCS index value used by the vehicle 300 to its smallest value. The reception quality of information received from the vehicle 300 by the remote control apparatus 40 is thereby increased, and the communication delay accordingly reduced. This constitutes handling processing for reducing a communication delay with the second embodiment. It is thereby made unnecessary to install additional equipment for reducing the communication delay, while ensuring that appropriate remote control can be maintained when the drive condition of the vehicle 300 is changing.

[3. Third Embodiment]

[3-1. Points of Difference from Second Embodiment]

The following description of a third embodiment is centered on the points of difference from the second embodiment, with description of features common to the second embodiment being omitted.

Figure 7:
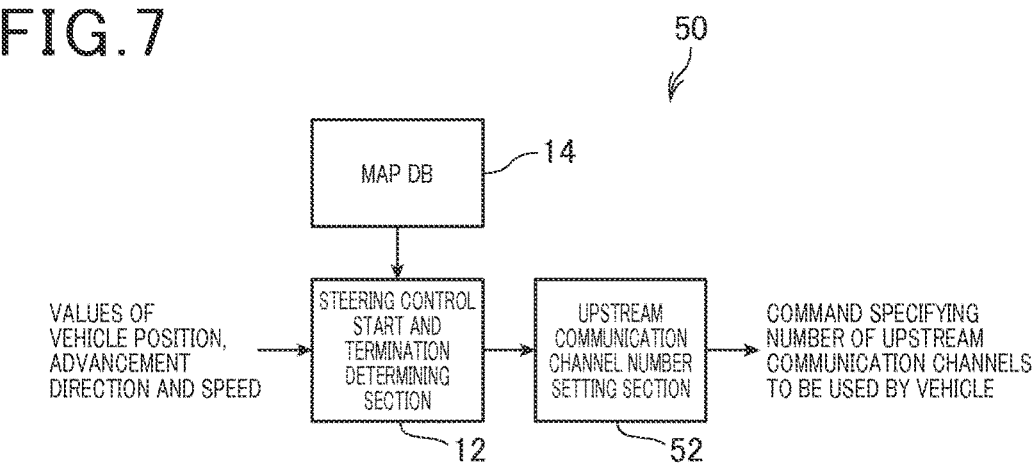
FIG. 7 is a block diagram for describing a remote control apparatus of a third embodiment.

The functions executed by a remote control apparatus 50 of the third embodiment are shown conceptually in the block diagram of FIG. 7.

With the second embodiment, when the vehicle 300 reaches a position along the route 310 at which it becomes necessary to reduce the communication delay, the remote control apparatus 40 commands the vehicle 300 to reduce the MCS index value used by the vehicle 300. With the third embodiment, when the vehicle 300 reaches a position where it is necessary to reduce the communication delay, the remote control apparatus 50 commands the vehicle 300 to transmit the vehicle information by multiplexed operation of a plurality of upstream communication channels. This is a point of difference between the third and second embodiments. Here, "upstream communication channel" signifies a wireless communication channel used by the vehicle 300 for transmitting vehicle information to the remote control apparatus 50.

With this embodiment, "commanding that multiplexing of upstream communication channels is to be performed" constitutes handling processing for dealing with a requirement to reduce communication delay.

Figure 8:
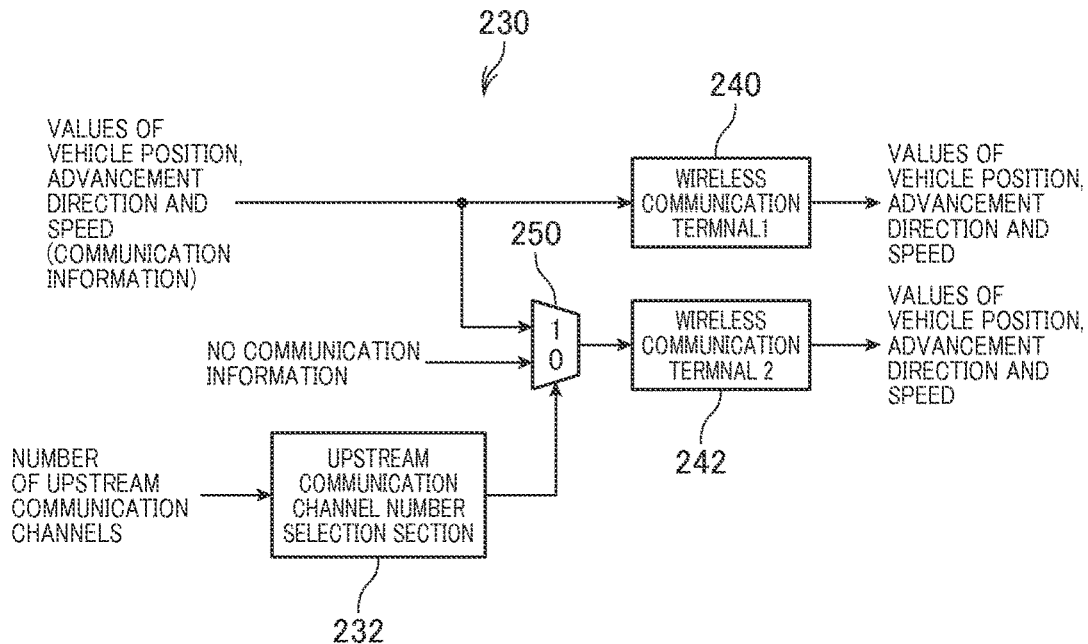
FIG. 8 is a block diagram for describing a vehicle control apparatus of the third embodiment.

The third embodiment further differs from the second embodiment in that the vehicle 300 of the third embodiment is equipped with a vehicle-installed wireless communication apparatus 230 having the configuration shown in FIG. 8. As shown, the vehicle-installed wireless communication apparatus 230 includes two wireless communication terminals 240 and 242, an upstream communication channel number selection section 232 and a selector 250. The upstream communication channel number selection section 232 controls the selector 250 such that the vehicle information of the vehicle 300 is supplied either to the wireless communication terminal 240 alone, or is supplied to both of the wireless communication terminals 240 and 242.

With the remote control apparatus 50 of this embodiment, when the steering control start and termination determining section 12 sets the steering control flag to the on state, the upstream communication channel number setting section 52 determines the number of upstream communication channels (with this embodiment, either one or two upstream communication channels) to be used by the vehicle 300 at that time. The determination is made based on whether the vehicle 300 is currently being controlled for travel along a straight part or a curved part of the route 310, and on the current speed of the vehicle 300. A command specifying the required number of upstream communication channels is then transmitted by the remote control apparatus 50 to the vehicle 300.

When that command is acquired by the upstream communication channel number selection section 232 of the vehicle 300, the selector 250 is controlled accordingly by the upstream communication channel number selection section 232, to select one or both of the wireless communication terminals 240 and 242 for use in transmitting the vehicle information to the remote control apparatus 50.

Specifically, when the remote control apparatus 50 designates that only a single upstream communication channel is to be used, the upstream communication channel number selection section 232 controls the selector 250 to select only the wireless communication terminal 240 for transmitting the vehicle information to the remote control apparatus 50, while when the command from the remote control apparatus 50 specifies multiplexing of upstream communication channels, the upstream communication channel number selection section 232 controls the selector 250 to select both the of the wireless communication terminals 240 and 242 for transmitting the vehicle information to the remote control apparatus 50 by multiplexed operation.

[3-2. Processing Executed by Remote Control Apparatus 50]

Figure 9:
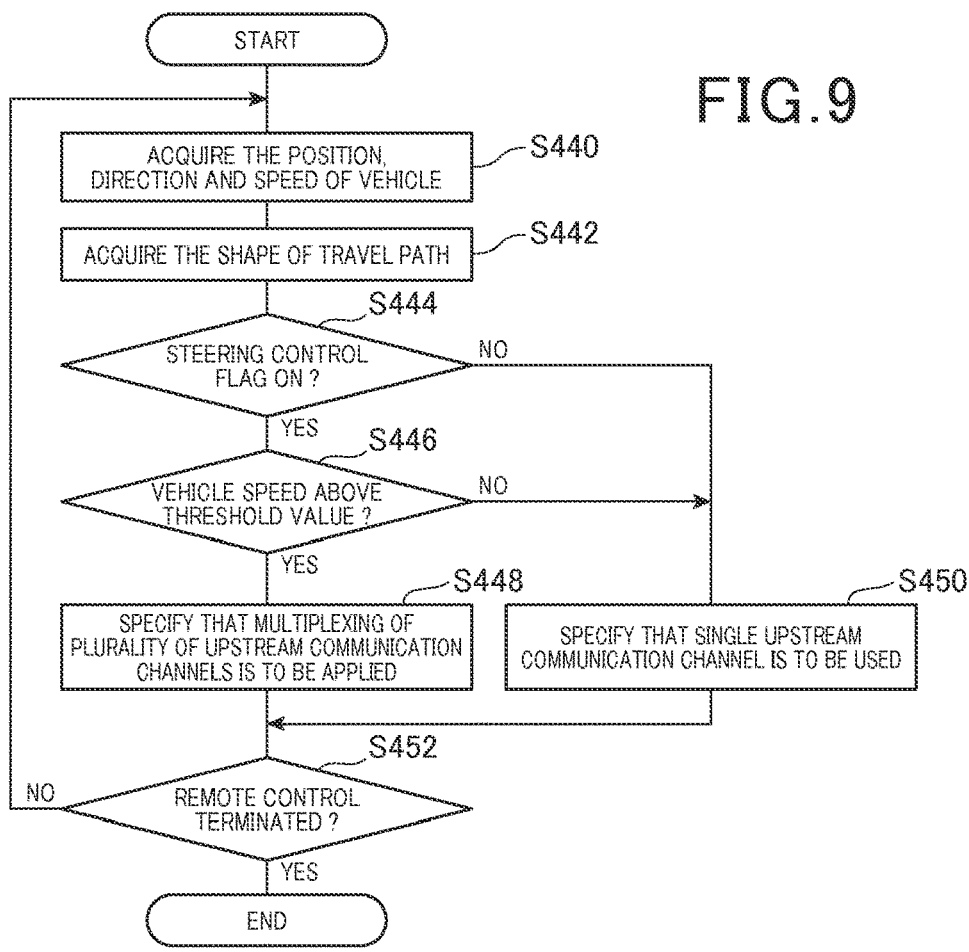
FIG. 9 is a flow diagram of remote control processing executed with the third embodiment.

The remote control processing executed by the remote control apparatus 50 will be described referring to the flow diagram of FIG. 9. In FIG. 9, steps S440, S442 and S452 are respectively identical to steps S420, S422 and S432 in FIG. 6 of the second embodiment, so that description is omitted.

If the steering control flag is in the off state (NO in step S444), it is judged that it is not necessary to reduce the communication delay, and step S450 is then executed. If the steering control flag is in the on state (YES in step S444), a decision is made as to whether the vehicle speed is above the threshold value (step S446).

If the vehicle speed is above the threshold value (YES in step S446), it is judged that it is necessary to reduce the communication delay with respect to the position at which the vehicle 300 is currently located, and step S448 is then executed for commanding the vehicle 300 to perform multiplexing of upstream communication channels. Step S452 is then executed.

If the vehicle speed does not exceed the threshold value (NO in step S446), it is judged that it is not necessary to reduce the communication delay, and step S450 is then executed, in which the vehicle 300 is commanded to use only a single upstream communication channel. Step S452 is then executed.

[3-3. Processing Executed by Vehicle-installed Wireless Communication Apparatus 230]

Figure 10:
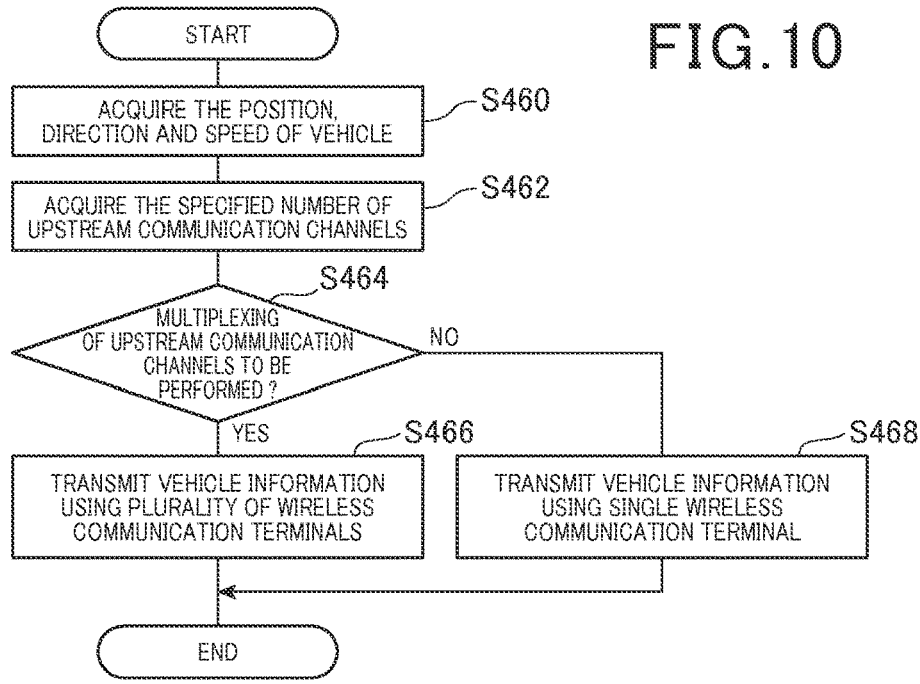
FIG. 10 is a flow diagram of processing that is executed by the vehicle control apparatus, with the third embodiment.

Processing executed by the vehicle-installed wireless communication apparatus 230 of this embodiment will be described referring to the flow diagram of FIG. 10.

Firstly (step S460), the vehicle-installed wireless communication apparatus 230 acquires the vehicle information of the vehicle 300, i.e., the currently detected values of vehicle position, advancement direction, speed, etc., from a GPS apparatus and sensors (not shown in the drawings) of the vehicle 300. Next, information is acquired expressing the number of upstream communication channels currently commanded by the remote control apparatus 50. If the latest command received from the remote control apparatus 50 specifies that multiplexing is to be performed (YES in step S464), the vehicle-installed wireless communication apparatus 230 uses both of the wireless communication terminals 240 and 242, in multiplexed operation, for transmitting the vehicle information to the remote control apparatus 50 (step S466). If the remote control apparatus 50 specifies that only a single upstream communication channel is to be used (NO in step S464), the vehicle-installed wireless communication apparatus 230 uses only the wireless communication terminal 240 for transmitting the vehicle information to the remote control apparatus 50 (step S468).

[3-4. Effects]

With the third embodiment described above, the following effects are obtained.

(1) While the vehicle 300 is traveling along the route 310, when the vehicle 300 reaches a position where the drive condition is changing and it becomes necessary to reduce the communication delay, a pair of upstream communication channels used by the vehicle 300 are operated in multiplex. The rate at which data are transmitted via each of the upstream communication channels is thereby reduced, enabling the reception signal quality at the remote control apparatus 50 to be improved, thereby reducing the communication delay. Appropriate remote control can thereby be maintained by the remote control apparatus 50 through wireless communication, when the drive condition of the vehicle 300 is changing.

(2) When multiplexed operation of the upstream communication channels is performed, excessive communication delay can be prevented even if one of the upstream communication channels becomes defective, since the other communication channel can continue to be utilized.

[4. Fourth Embodiment]

[4-1. Points of Difference from Second Embodiment]

The following description of a fourth embodiment is centered on the points of difference from the second embodiment, with description of features common to the second embodiment being omitted.

Figure 11:
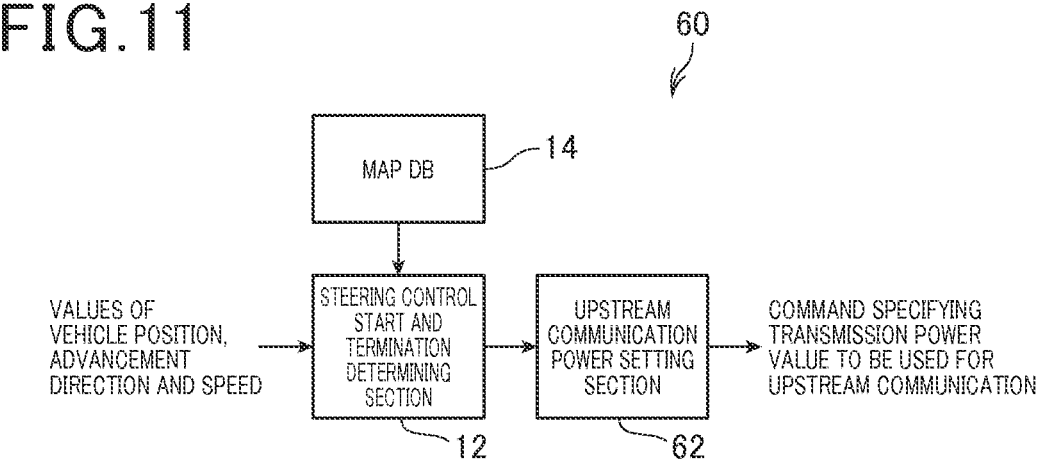
FIG. 11 is a block diagram for describing a remote control apparatus of a fourth embodiment.

The functions executed by a remote control apparatus 60 of the fourth embodiment are shown conceptually in the block diagram of FIG. 11.

With the second embodiment, when the vehicle 300 is driving along the route 310 and reaches a position where it is necessary to reduce the communication delay (as defined hereinabove), this is achieved by causing the vehicle 300 to set the MCS index to its smallest value. With the fourth embodiment, when the vehicle 300 reaches a position where the communication delay must be reduced, the remote control apparatus 60 transmits a command to the vehicle 300 specifying that the transmission power for upstream communication is to be increased (that is, increased power of a modulated transmission signal which is generated by the wireless communication apparatus 210 of the vehicle 300).

As shown in FIG. 11, the remote control apparatus 60 includes an upstream communication power setting section 62 in addition to the map database 14 and steering control start and termination determining section 12, with the upstream communication power setting section 62 connected to the output of the steering control start and termination determining section 12. While the steering control start and termination determining section 12 sets the steering control flag in the on state, the upstream communication power setting section 62 commands the vehicle 300 to increase the upstream transmission power (i.e., executes processing for transmitting a command to the vehicle 300, specifying that the transmission power is to be increased above a normal value).

[4-2. Processing Executed by Remote Control Apparatus 60]

Figure 12:
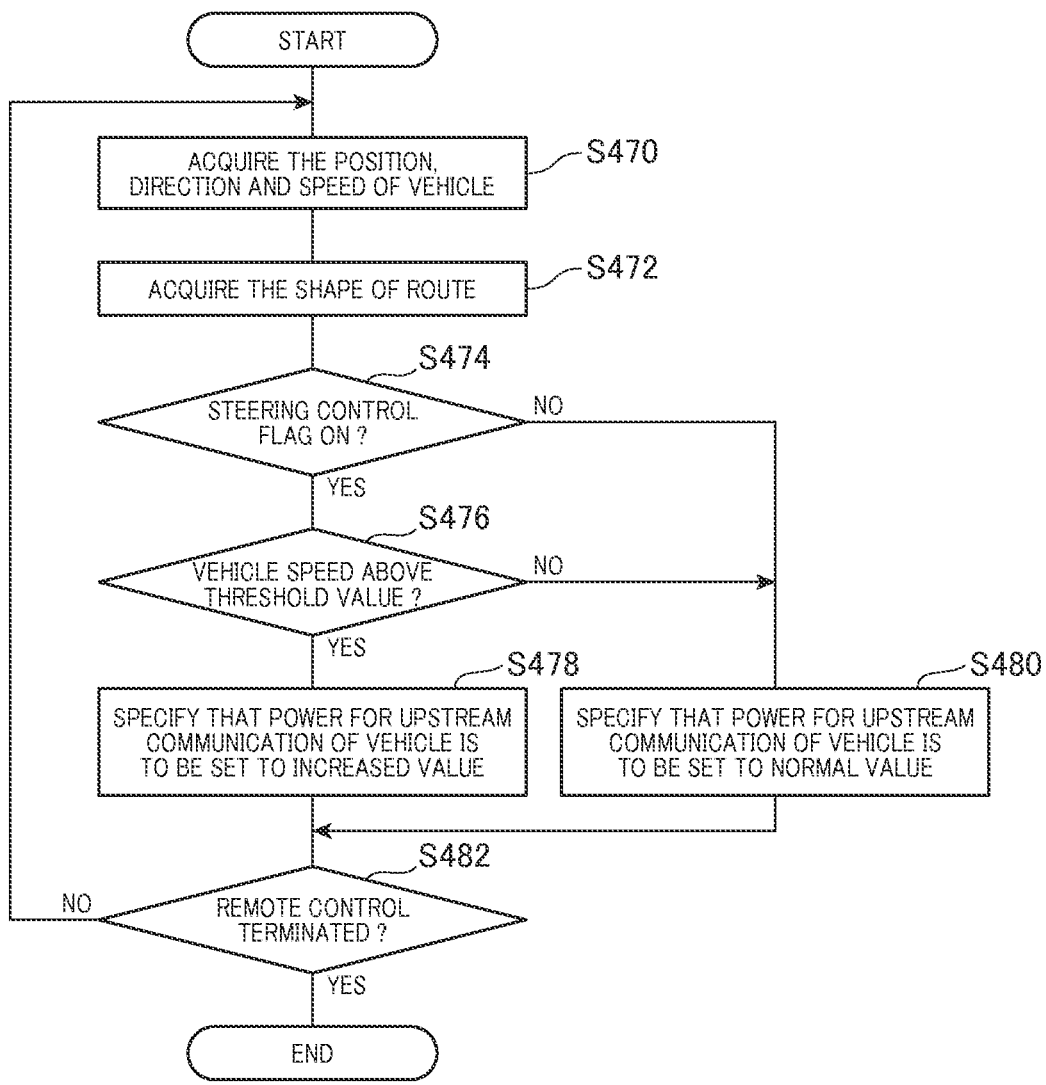
FIG. 12 is a flow diagram of remote control processing that is executed with the fourth embodiment.

The remote control processing executed by the remote control apparatus 60 will be described referring to the flow diagram of FIG. 12. In FIG. 12, steps S470, S472 and S482 are respectively identical to steps S420, S422 and S432 in FIG. 6 of the second embodiment, so that description is omitted.

If the steering control flag is in the off state (NO in step S474), the remote control apparatus 60 judges that it is not necessary to reduce the communication delay, and step S480 is then executed. If the steering control flag is in the on state (YES in step S474), step S476 is executed, to judge whether the vehicle speed is above the threshold value.

If the vehicle speed is above the threshold value (YES in step S476), it is judged that it is necessary to reduce the communication delay with respect to the current position of the vehicle 300, and step S478 is then executed for commanding the vehicle 300 to increase the transmission power for upstream communication. Step S482 is then executed, to judge whether remote control is to be ended.

If the vehicle speed does not exceed the threshold value (NO in step S476), step S480 is then executed, in which the vehicle 300 is commanded to use the normal level of transmission power. Step S482 is then executed.

[4-3. Effects]

The following effects are obtained with the fourth embodiment. While the vehicle 300 is traveling along the route 310 and reaches a position where the drive condition is changing and it becomes necessary to reduce the communication delay, the transmission power of the vehicle 300 is caused to be increased above a normal level. Appropriate remote control through wireless communication can thereby be maintained, without requiring that additional equipment be installed for reducing the communication delay.

[5. Fifth Embodiment]

[5-1. Points of Difference from First Embodiment]

The following description of a fifth embodiment is centered on the points of difference from the first embodiment, with description of features common to the first embodiment being omitted.

Figure 13:
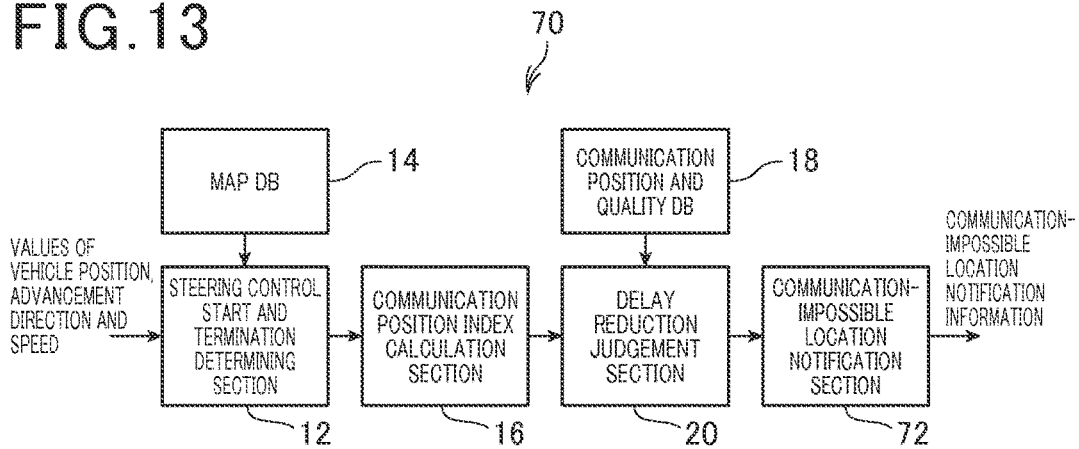
FIG. 13 is a block diagram for describing a remote control apparatus of a fifth embodiment.

The functions executed by a remote control apparatus 70 of the fifth embodiment are shown conceptually in the block diagram of FIG. 13.

With the first embodiment, while the vehicle 300 is traveling along the route 310, the remote control apparatus 10 determines respective positions at which the communication delay is excessive (in relation to the vehicle speed and communication quality), and stores corresponding information. After the vehicle 300 has completed driving along the route 310, the remote control apparatus 10 uses the stored information to determine respectively locations where receiving antennas are to be installed, for increasing the communication quality of upstream communication and so reducing the communication delay. With the fifth embodiment, information expressing positions along the route 310 at which the communication delay is excessive (in relation to the vehicle speed and communication quality) is acquired and stored, and is used to find those parts of the route where the communication quality is insufficient, so that the communication delay must be reduced, as for the first embodiment. However with the fifth embodiment, the results obtained are notified to the vehicle 300.

The vehicle 300 can then (after having received and stored the notification information) take appropriate measures when traversing these parts of the route where the communication quality is insufficient. This is the essential point of difference from the first embodiment.

As shown in FIG. 13, the remote control apparatus 70 differs from the remote control apparatus 10 of the first embodiment in that a communication-impossible location notification section 72 is connected to receive the output from the delay reduction judgement section 20, and produces information ("communication-impossible location notification information") to be transmitted to the vehicle 300. This information specifies the locations of those parts of the route 310 where the communication quality is insufficient (communication delay is excessive).

[5-2. Processing Executed by Remote Control Apparatus 70]

Figure 14:
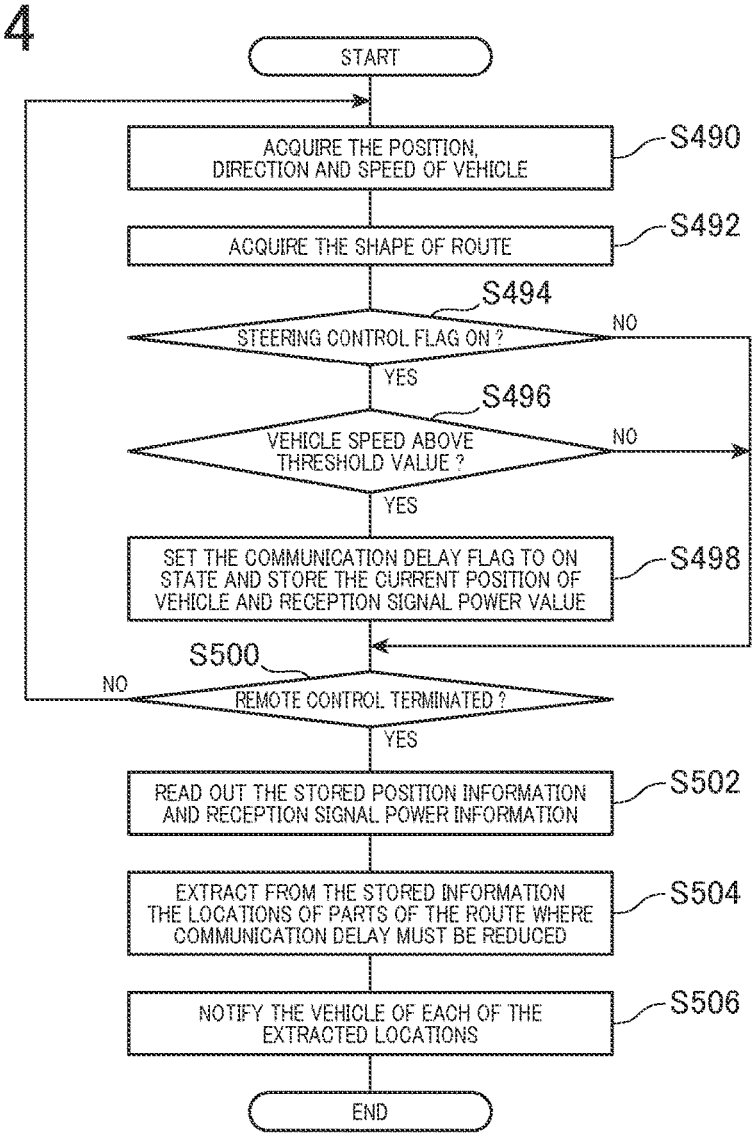
FIG. 14 is a flow diagram of remote control processing that is executed with the fifth embodiment.

The remote control processing executed by the remote control apparatus 70 will be described referring to the flow diagram of FIG. 14. In FIG. 14, steps S490~S504 are respectively identical to steps S400~S414 in FIG. 4 of the first embodiment, so that description is omitted.

Following step S504, processing is performed (step S506) for transmitting the communication-impossible location notification information to the vehicle 300.

[5-3. Effects]

The fifth embodiment provides the following effects. While the vehicle 300 is traveling along the route 310, the remote control apparatus 70 stores the positions on the route 310 where the drive condition is changing and the vehicle speed is above the threshold value, with the corresponding values of reception signal power at these positions also being stored. Subsequently (after completion of travel along the route 310) the stored information is used to obtain the locations of each of the parts of the route 310 in which the communication quality is insufficient for reliable upstream communication. The remote control apparatus 70 then executes processing for transmitting information to the vehicle 300, notifying the locations of these parts of the route 310 where the communication quality is insufficient, so that the communication delay is excessive. This notification constitutes handling processing executed by the remote control apparatus of this embodiment for dealing with excessive communication delay.

Suitable processing can then be selected at the vehicle 300 side, in view of the notification information.

For example, when the vehicle 300 reaches a part of the route 310 where a sufficient level of communication quality cannot be ensured, the vehicle 300 may reduce speed, or (as a fail safe measure) become halted.

[6. Sixth Embodiment]

[6-1. Points of Difference from Second Embodiment]

The following description of a sixth embodiment is centered on the points of difference from the second embodiment, with description of features common to the second embodiment being omitted.

Figure 15:
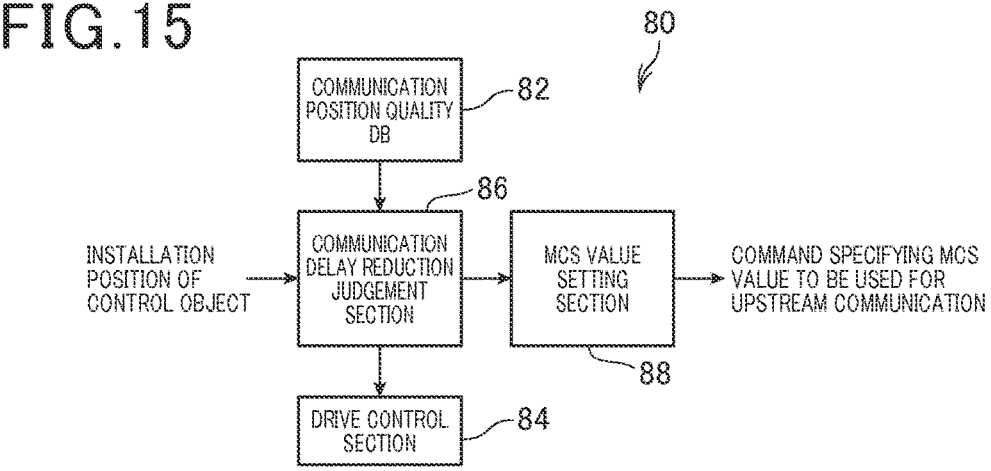
FIG. 15 is a block diagram of a remote control apparatus of a sixth embodiment.

The functions executed by a remote control apparatus 80 of the sixth embodiment are shown conceptually in the block diagram of FIG. 15.

The second embodiment above is applicable to a control object that is a vehicle (the vehicle 300), controlled by a remote control apparatus through wireless communication. When the vehicle is driving along a predetermined route and reaches a position at which it is necessary to reduce the communication delay, this is achieved by setting the MCS index value used by the vehicle to its minimum value. The sixth embodiment however concerns a control object which is operated while remaining in a fixed location, with driving of a movable part of the control object being controlled by a remote control apparatus through wireless communication. Variation of a MCS index value used by the control object in transmitting information to the remote control apparatus, is applied in the same manner as described for the second embodiment, As shown in FIG. 15, the remote control apparatus 80 includes a communication position quality database 82, a drive control section 84, a communication delay reduction judgement section 86 and a MCS value setting section 88. The control object is an industrial robot, which can be driven when installed temporarily at a currently selected one of a plurality of predetermined locations (referred to in the following as "communication areas") on the floor of a factory. Here, "driving" signifies controlling motion of an arm of the industrial robot. While the industrial robot is being operated at one of these communication areas, drive condition information is transmitted from the industrial robot to the remote control apparatus 80. The drive condition information expresses the actual drive condition of the industrial robot (e.g., degrees of angular rotation of the robot arm with respect to various axes of rotation, etc.).

For each of the communication areas, a corresponding value of reception signal power (with respect to a signal received by the remote control apparatus 80 from the industrial robot) is obtained beforehand, when the robot is installed at that communication area. The reception signal power values are stored in the communication position quality database 82. For each communication area, the corresponding stored value of reception signal power is used as an index of the upstream communication quality (and hence the amount of communication delay) that can be expected when the industrial robot transmits from that communication area.

The drive control section 84 controls driving of the industrial robot based on the drive condition information transmitted from the robot.

When the industrial robot is being operated at one of the communication areas, the communication delay reduction judgement section 86 executes processing for judging whether it has become necessary to reduce a communication delay (with respect to upstream communication of information from the control object to the remote control apparatus, as described for the preceding embodiments). This judgement is made based upon the value of reception signal power (stored beforehand in the communication position quality database 82) corresponding to the communication area where the robot is currently installed, and upon whether the drive condition of the robot is changing, e.g., whether a rotation axis, rotation speed, etc., of the robot arm is being varied. Specifically, a decision is made as to whether the reception signal power attains a predetermined value, i.e., a value whereby the communication delay is sufficiently short when the drive condition of the control object is changing.

Based on the judgement results obtained by the communication delay reduction judgement section 86, if it is found necessary to reduce the communication delay, the MCS value setting section 88 executes processing for transmitting a command to the industrial robot specifying that the MCS index is to be set at its smallest value. When reduction of the communication delay is not required, the MCS value setting section 88 commands the robot to set the MCS index at its normal value.

[6-2. Processing Executed by Remote Control Apparatus 80]

Figure 16:
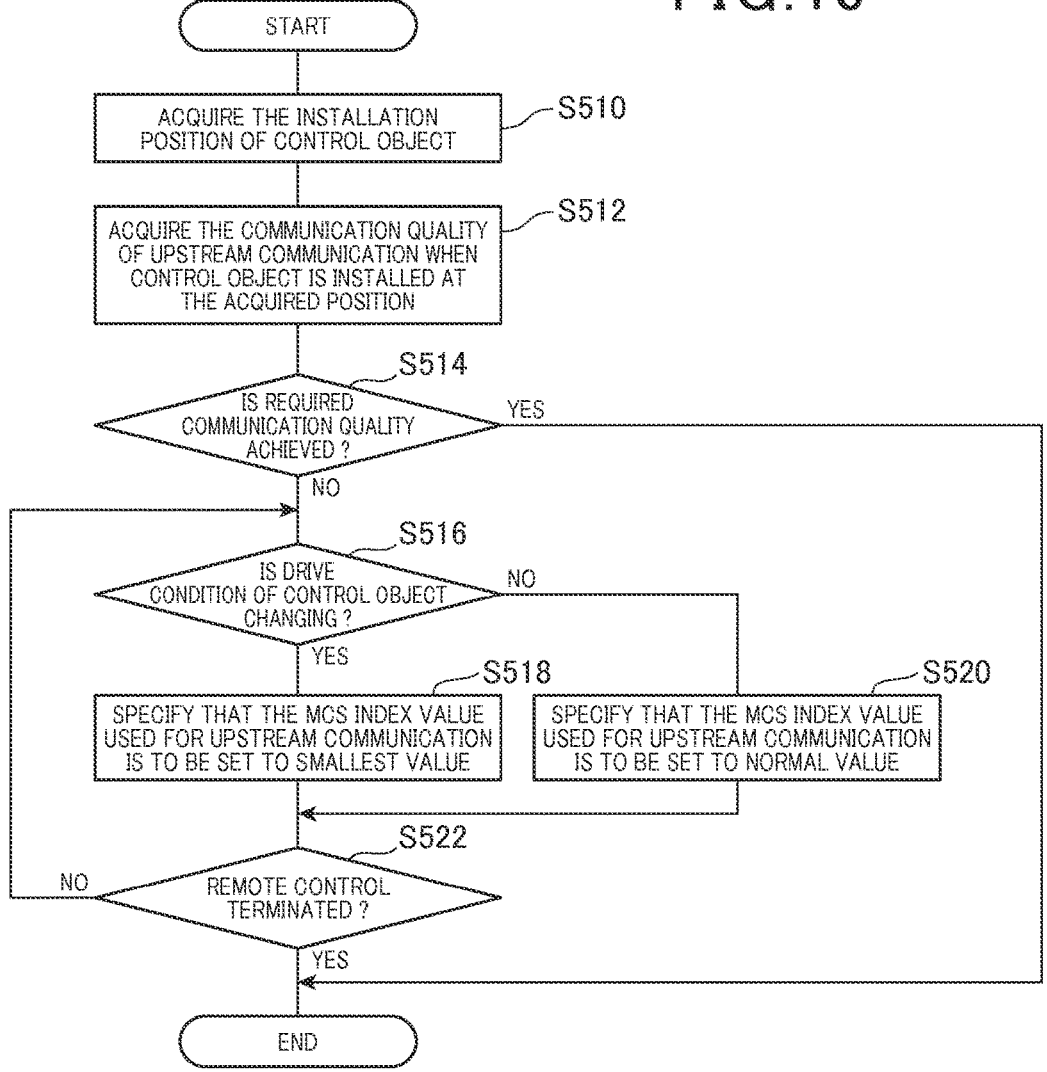
FIG. 16 is a flow diagram of remote control processing executed with the sixth embodiment.

The remote control processing executed by the remote control apparatus 80 will be described referring to the flow diagram of FIG. 16.

Firstly (step S510), the remote control apparatus 80 acquires information identifying the communication area where the industrial robot is currently fixedly installed. Next (step S512), the remote control apparatus 80 obtains (from the communication position quality database 82) the value of reception signal power that is achieved when drive condition information is transmitted from the industrial robot at the communication area where the robot is currently installed.

If the communication quality (as expressed by the reception signal power value) attains a predetermined level (YES in step S514), this processing is then terminated. Otherwise (NO in step S514), a decision is made as to whether the drive condition of the industrial robot is changing (S516). With this embodiment, the judgement is made based upon control commands that are issued by the drive control section 84 and transmitted to the industrial robot, for controlling driving of the robot. For example, control commands may designate changes in a direction of linear displacement motion of the arm of the robot. When such control commands are being transmitted by the remote control apparatus 80, it is judged that the drive condition of the industrial robot is changing.

If the drive condition is changing (YES in step S516), indicating that it is necessary to reduce the communication delay, a command is transmitted to the industrial robot to set the MCS index to its smallest value (step S518). If the drive condition is not changing (NO in step S516), the industrial robot is commanded to set the MCS index to its normal value (step S520).

The processing of steps S514 to S520 is continued until remote control is terminated (YES in step S522).

[6-3. Effects]

With the sixth embodiment described above, the following effects are obtained. When the control object is being driven while installed at a fixed location, if the drive condition is changing and a required level of communication quality cannot be ensured, so that the communication delay (for upstream communication from the control object) must be reduced, the control object is commanded to change the MCS index from a normal value to its smallest value. The communication quality can thereby be improved and the communication delay thereby reduced, when necessary, enabling satisfactory remote control to be maintained without requiring installation of additional equipment (reception antennas, etc.).

[7. Seventh Embodiment]
[7-1. Points of Difference from Sixth Embodiment]

The following description of a seventh embodiment is centered on points of difference from the sixth embodiment, with description of features common to the sixth embodiment being omitted.

Figure 17:
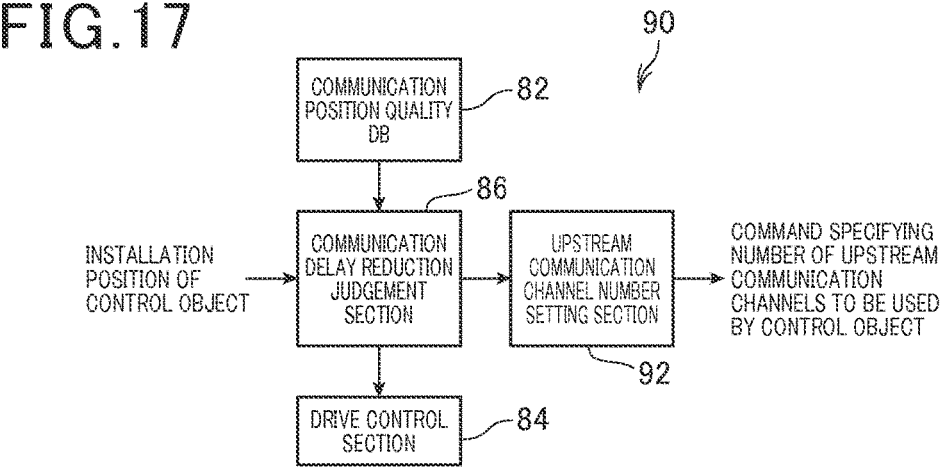
FIG. 17 is a block diagram for describing a remote control apparatus of a seventh embodiment.

The functions executed by a remote control apparatus 90 of the seventh embodiment are shown conceptually in the block diagram of FIG. 17. As shown, this includes a communication position quality database 82, a drive control section 84, a communication delay reduction judgement section 86 and an upstream communication channel number setting section 92.

With the sixth embodiment described above, when a control object is being driven while installed at a fixed location and the communication delay must be reduced, this is achieved by setting the MCS index used by the control object to its smallest value. With the seventh embodiment, when the communication delay must be reduced for such a control object, an upstream communication channel number setting section 92 of the remote control apparatus 90 commands the control object to apply multiplexed operation of a plurality of upstream communication links, to thereby improve the communication quality and so reduce the communication delay. This is the essential point of difference of the seventh embodiment from the sixth embodiment.

With the seventh embodiment, as for the third embodiment, a wireless communication apparatus of the control object (an industrial robot) includes two wireless communication terminals such as the wireless communication terminals 240 and 242 of the third embodiment, for upstream communication, i.e., for transmitting information to the remote control apparatus 90.

Based on judgement results obtained by the communication delay reduction judgement section 86, the upstream communication channel number setting section 92 transmits a command to the control object for specifying the number of upstream communication channels that are to be used by the control object for transmitting information to the remote control apparatus 90.

When the control object receives a command from the remote control apparatus 90 to use a plurality of upstream communication channels, the control object selects the wireless communication terminal 242 to be used in addition to the wireless communication terminal 240, by multiplexed operation. Drive information is thereby transmitted from both of the wireless communication terminals 240 and 242.

When the remote control apparatus 90 commands that a single upstream communication channel is to be used, the control object selects only the wireless communication terminal 240, so that the drive information is transmitted only from the wireless communication terminal 240.

[7-2. Processing Executed by Remote Control Apparatus 90]

Figure 18:
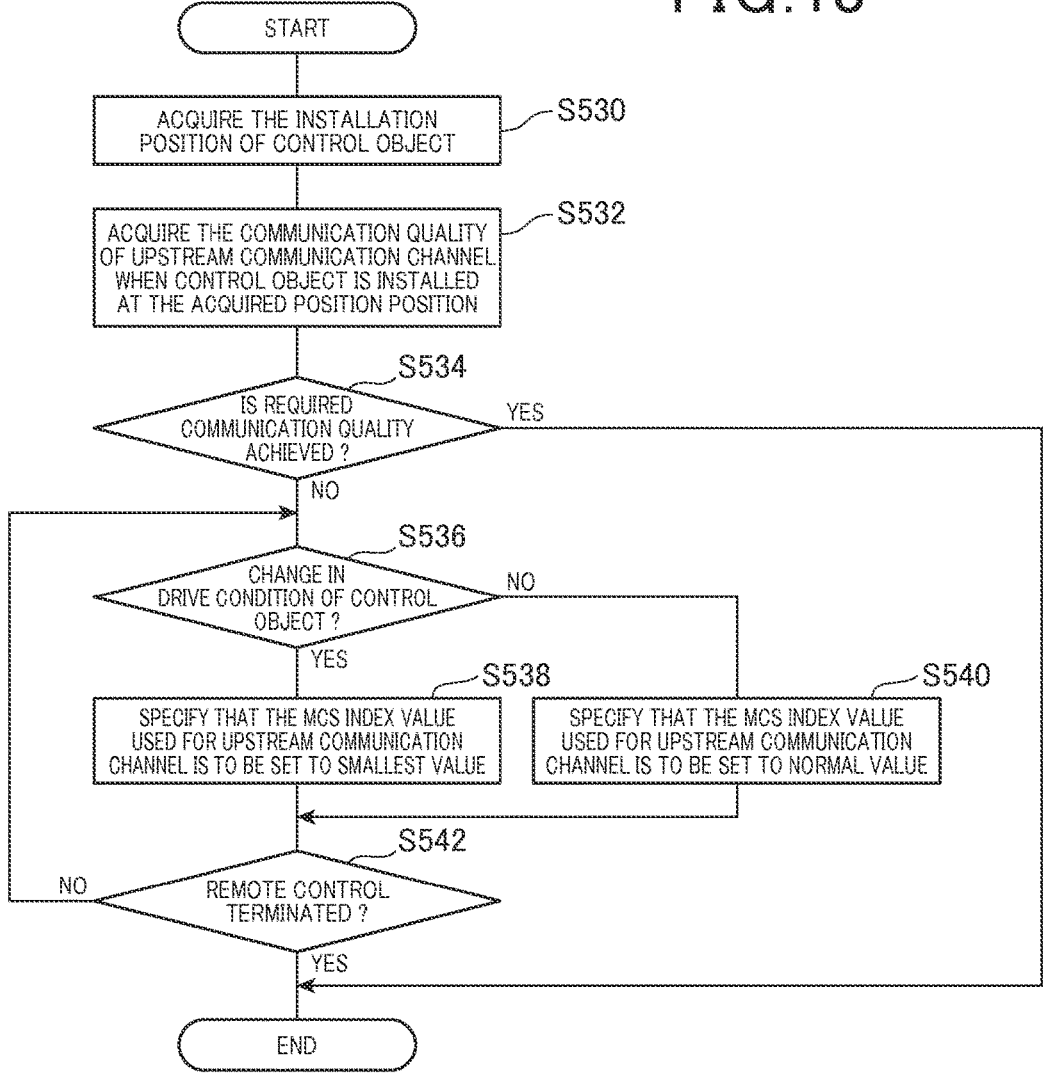
FIG. 18 is a flow diagram of remote control processing that is executed with the seventh embodiment.

The processing executed by the remote control apparatus 90 will be described referring to the flow diagram of FIG. 18. In FIG. 18, steps S530 to S534 and S542 are identical to steps S510 to S514 and S522 in FIG. 16 of the sixth embodiment, so that description is omitted.

If it is judged that the communication quality is insufficient (NO in step S534), while also the drive condition of the control object is changing (YES in step S536), it is judged that it is necessary to reduce the communication delay, and so the control object is commanded to use multiplexed operation of a plurality of upstream communication channels (step S538). Step S542 is then executed.

If the drive condition is not changing (NO in step S536), the remote control apparatus 90 judges that it is not necessary to reduce the communication delay, and so commands the control object to use only a single upstream communication channel. Step S542 is then executed.

The processing of steps S536 to S540 is continued until remote control of the control object is terminated (YES in step S542).

[7-3. Effects]

With the seventh embodiment described above, the following effects are obtained:

(1) When the control object is being driven while installed at a fixed location, if the drive condition of the control object is changing and a required level of communication quality cannot be ensured so that the communication delay must be reduced, a plurality of upstream communication channels used by the control object are used in multiplexed operation, to thereby increase the communication quality and so reduce the communication delay.

(2) When both of the upstream communication channels are used in multiplexed operation, if an excessive level of communication delay is caused by defective operation of one of the wireless communication terminals of the control object, the communication delay can be reduced, since the remaining wireless communication terminal will continue in use.

[8. Eighth Embodiment]

[8-1. Points of Difference from Sixth Embodiment]

The following description of an eighth embodiment is centered on the points of difference from the sixth embodiment, with description of features common to the sixth embodiment being omitted.

Figure 19:
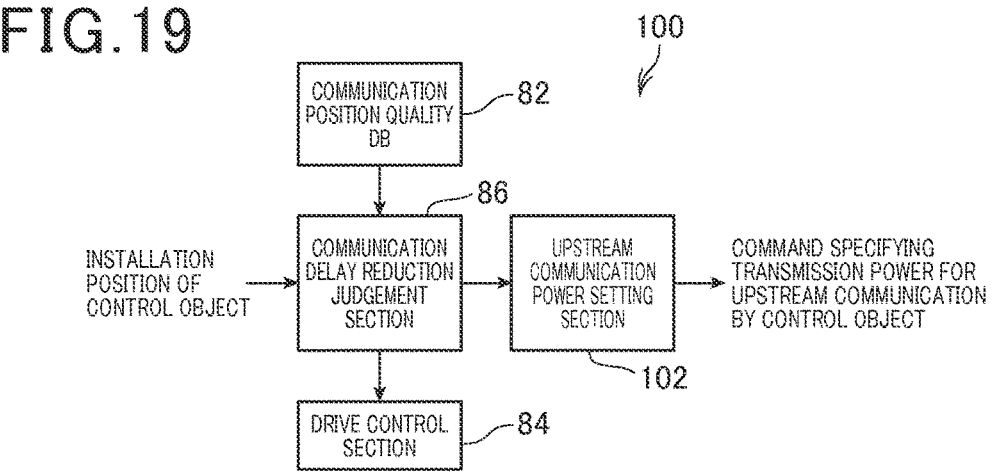
FIG. 19 is a block diagram for describing a remote control apparatus of an eighth embodiment.

The functions executed by a remote control apparatus 100 of the eighth embodiment are shown conceptually in the block diagram of FIG. 19. As shown, this includes a communication position quality database 82, a drive control section 84, a communication delay reduction judgement section 86 and an upstream communication power setting section 102.

With the sixth embodiment described above, when a control object is being driven while installed at a fixed location and the communication delay must be reduced, this is achieved by setting the MCS index used by the control object to its smallest value. With the eighth embodiment, when the communication delay is required to be reduced, the remote control apparatus 100 causes the control object to increase the level of transmission signal power (as defined hereinabove). This is the essential point of difference of the eighth embodiment from the sixth embodiment.

The upstream communication power setting section 102 of the remote control apparatus 100 determines a required value of transmission signal power in accordance with the drive condition of the control object, and transmits a corresponding command to the control object. More specifically, with this embodiment, the command specifies either that a normal value or an increased (higher than normal) value of transmission signal power is to be used by the control object.

[8-2. Processing Executed by Remote Control Apparatus 100]

Figure 20:
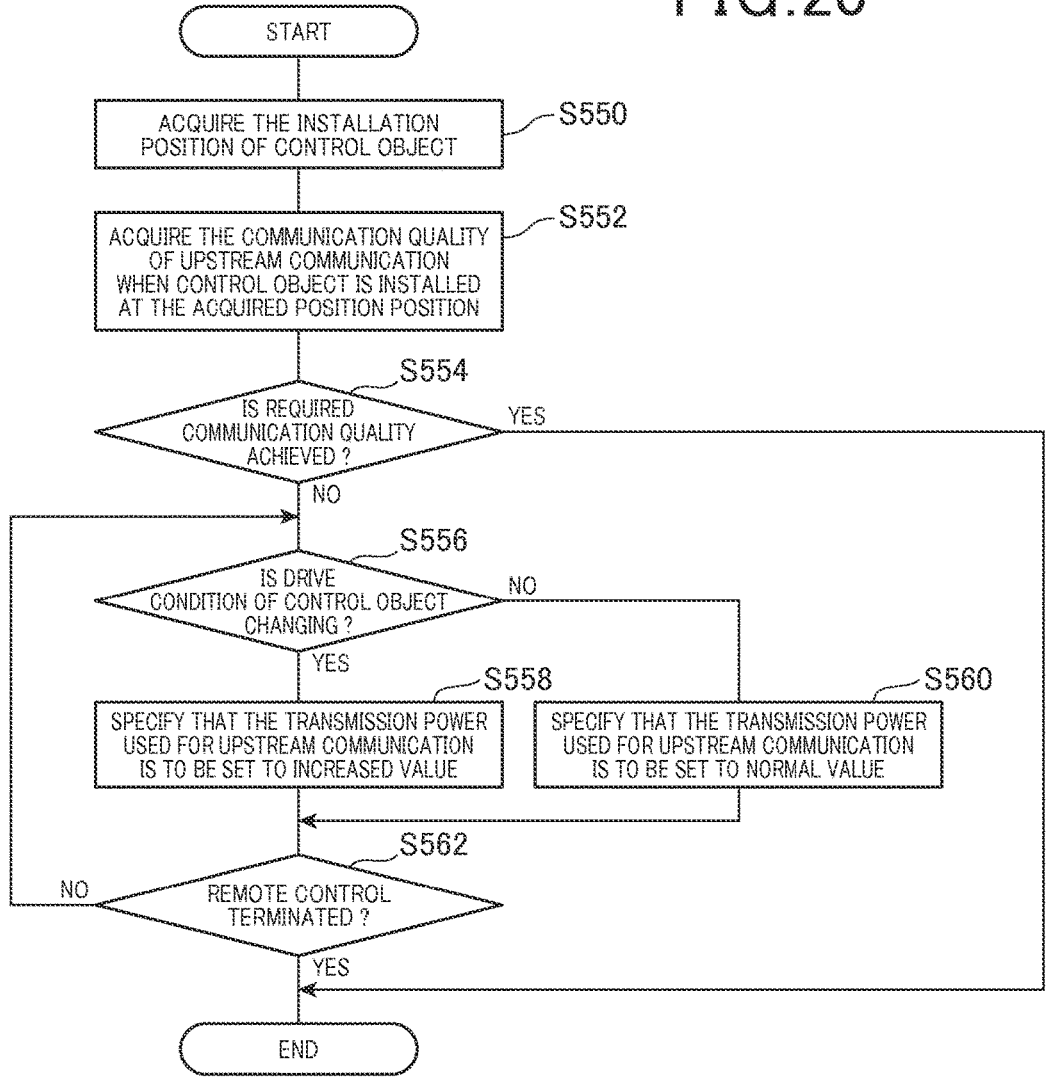
FIG. 20 is a flow diagram of remote control processing executed with the eighth embodiment.

The processing executed by the remote control apparatus 100 will be described referring to the flow diagram of FIG. 20. In FIG. 20, steps S550 to S554 and S562 are identical to steps S510 to S514 and S522 in FIG. 16 of the sixth embodiment, so that description is omitted.

If it is judged that the communication quality is insufficient (NO in step S554), while also the drive condition of the control object is changing (YES in step S556), the remote control apparatus 100 determines that it is necessary to reduce the communication delay, and so transmits a command to the control object for applying an increased value of transmission signal power (step S558). Step S562 is then executed. If the drive condition of the control object is not changing (NO in step S556), step S560 is executed, in which the control object is commanded to apply a normal value of transmission signal power, and step S562 is then executed. The processing of steps S556 to S560 is continued until remote control of the control object is terminated (YES in step S562).

[8-3. Effects]

The following effects are obtained with the eighth embodiment. When the target object is being operated while at a fixed location, if the drive condition of the control is changing and it becomes necessary to reduce the communication delay, the transmission power used by the control object for wireless communication is increased. With the eighth embodiment, transmission of a command by the remote control apparatus for increasing the transmission power constitutes handling processing for reducing the communication delay.

It is thereby made unnecessary to set up additional equipment (antennas, etc.,) for reducing the communication delay, while ensuring that appropriate remote control is maintained through wireless communication.

[9. Alternative Embodiments]

Although the invention has been described referring to specific embodiments, the scope of the invention is not limited to these, and various alternative embodiments or modifications of the described embodiments may be envisaged which fall within the scope claimed for the invention, for example as follows:

(1) The first embodiment above has been described for the example of a mobile object that is a vehicle which travels along a predetermined route. However the invention is not limited to such a control object, and is applicable in general to any type of mobile object which can be controlled through wireless communication by a remote control apparatus.

(2) With the first and fifth embodiment above, the necessary conditions for executing handling processing to reduce a communication delay at a part of a route traveled by a vehicle 300 are that the communication delay exceeds an allowable range while also the vehicle is traveling on a curved part of a route, and the vehicle speed exceeds the threshold value. With each of the second to fourth embodiments, the necessary conditions are that the vehicle is traveling on a curved part of the route while also the vehicle speed exceeds the threshold value.

However it would be equally possible to make the necessary condition for executing such handling processing be only that the vehicle is traveling along a curved part of the route.

(3) With each of the first to fifth embodiments, when it is judged that the drive condition of the vehicle 300 is changing, the decision is made based on determining that the vehicle is traveling along a curved part 312 of the route, so that steering control is being applied by the remote control apparatus. However it would also be possible for the remote control apparatus to judge that the drive condition of the vehicle is changing based upon determining that the vehicle is traveling on a part of a route where there are variations in gradient, so that torque control or shift (gear change) control of the vehicle is being varied accordingly.

(4) Each of the sixth to eighth embodiments have been described for the case of a control object that is an industrial robot which is operated at a fixed location. However the invention would be equally applicable to any type of control object that is operated at a fixed location, under remote control through wireless communication by a remote control apparatus.

(5) With each of the sixth to eighth embodiments, applying remote control of a control object located at a fixed location, the necessary condition for executing handling processing to reduce a communication delay is that the drive condition of the control object is changing while also the communication quality (for transmission of information from the control object) is lower than a predetermined allowable range.

However it would be equally possible to make the necessary condition for executing handling processing be only that the drive condition of the fixed-location control object is changing.

(6) It would be possible to disperse one or more of the constituent elements of the above embodiments as respective pluralities of constituent elements, or to combine a plurality of constituent elements of an embodiment into a single constituent element. Furthermore it would be possible to replace at least a part of the constituent elements of an embodiment by a device having a known type of configuration and having the same function as the replaced constituent element. Furthermore it would be possible to replace a part of an embodiment by a part of another embodiment, or to add a part of an embodiment to another embodiment. Hence the above description of embodiments is to be understood as being illustrative of the invention and not as limiting the scope claimed for the invention, since various modifications or alternative configurations of the embodiments may be envisaged.

(7) Each of the above embodiments has been described for the case of a single remote control apparatus which controls a single control object. However the invention is applicable to remote control apparatuses and remote control systems in general, whose processing functions are implemented by computers through execution of programs that have been stored beforehand in a data storage medium.

In the appended claims, a drive condition judgement circuitry is exemplified by a computer in executing the judgement step S404, S424, S444, S474, S494, S516, S536 or S556 of the above embodiments in accordance with a stored program. Similarly, a handling circuitry recited in the claims is exemplified by execution of step S416, S428, S448, S478, S506, S518, S538 or S558, and a delay judgement circuitry is exemplified by execution of step S414 or S504.

What is claimed is:

1. A remote control apparatus for executing remote control driving of a control object through wireless communication with the control object, comprising:
    drive condition judgement circuitry configured to determine a drive condition of the control object, and
    handling circuitry configured to adjust handling processing of the wireless communication by the control object in response to a predetermined requirement for executing the handling processing;
    wherein adjusting the handling processing of the wireless communication by the control object adjusts the output of wireless communication transmitted from the control object to reduce a communication delay between the control object and the remote control apparatus,
    wherein the predetermined requirement for executing the handling processing is a determination that the drive condition of the control object is changing.

2. The remote control apparatus as claimed in claim 1, wherein:
    the remote control apparatus comprises speed judgement circuitry configured to judge a drive speed of the control object; and,
    the handling circuitry adjusts the handling processing in response to an additional predetermined requirement, the additional predetermined requirement comprising a determination that the drive speed of the control object is judged to exceed a specific threshold value of speed.

3. The remote control apparatus as claimed in claim 2, wherein:
    the control object is a mobile object which travels along a predetermined route, and the drive speed is a motion speed of the control object; and,
    the threshold value of speed is determined based on a shape of a part of the route where the control object is currently traveling.

4. The remote control apparatus as claimed in claim 1, wherein:
    the remote control apparatus comprises delay judgement circuitry configured to judge a value of the communication delay; and,
    the handling circuitry adjusts the handling processing in response to an additional predetermined requirement, the additional predetermined requirement comprising a determination that the communication delay is judged to exceed an allowable range of delay values.

5. The remote control apparatus as claimed in claim 4, wherein the judgement circuitry judges the communication delay based upon a level of communication quality of communication data received from the control object by the remote control apparatus.

6. The remote control apparatus as claimed in claim 5, wherein the level of communication quality is expressed as a reception signal power value, comprising a value of power of a signal conveying the transmitted information and received from the control object.

7. The remote control apparatus as claimed in claim 1 wherein a modulation method and an encoding factor used in communication between the control object and the remote control apparatus are determined in accordance with a MCS (Modulation and Coding Scheme) index value, and wherein the handling processing comprises transmitting a command to the control object for reducing the MCS index value utilized by the control object.

8. The remote control apparatus as claimed in claim 1, wherein the handling processing comprises transmitting a command to the control object for increasing a number of communication channels used by the control object for communication with the remote control apparatus.

9. The remote control apparatus as claimed in claim 1, wherein the handling processing comprises commanding the control object to increase a value of power of a transmission signal used by the control object for communication with the remote control apparatus.

10. The remote control apparatus as claimed in claim 1, wherein:
    the control object is a mobile object which travels along a predetermined route; and,
    the drive condition judgement circuitry is configured to acquire information expressing a current position of the control object, and to judge whether the drive condition of the control object is changing based upon the current position of the control object and upon the shape of the route.

11. The remote control apparatus as claimed in claim 10, wherein:
    the handling processing executed by the handling circuitry is executed after the control object has completed travel along the route;
    the handling processing comprises specifying that receiving antennas for use in communicating data from the control object to the remote control apparatus are to be installed at respective positions along the route; and,
    the positions for installing the receiving antennas are respective positions attained by the control object at which the requirement for executing the handling processing became satisfied, when the control object traveled along the route prior to installing the antennas.

12. The remote control apparatus as claimed in claim 10, wherein:
    the handling processing is executed after the control object has completed travel along the route;
    the handling processing comprises transmitting information to the control object for notifying the control object of respective positions along the route; and, the notified positions route are respective positions attained by the control object at which the requirement for executing the handling processing became satisfied, when the control object traveled along the route prior to executing the notification.

13. The remote control apparatus as claimed in claim 1, wherein:
an additional requirement for executing the handling processing is predetermined, whereby the communication delay exceeds an allowable range of delay values;
the control object is installed at a fixed location and comprises a movable member driven under control of the remote control apparatus;
the communication delay is calculated based on a value of reception signal power of a signal received by the remote control apparatus from the control object; and
the remote control apparatus comprises communication delay reduction judgement circuitry configured for judging when the requirements for executing the handling processing are satisfied.

14. The remote control apparatus as claimed in claim 13, wherein the reception signal power value is predetermined and is stored in a database of the remote control apparatus.

15. The remote control apparatus as claimed in claim 14, wherein:
the control object is temporarily fixedly installed at a selected one of a plurality of predetermined installation locations;
reception signal power values respectively corresponding to the plurality of installation locations are predetermined and stored in the database of the remote control apparatus; and,
the communication delay reduction judgement circuitry acquires a reception signal power value corresponding to the currently selected installation location of the control object, from the database.

16. A remote control system comprising the remote control apparatus as claimed in claim 1 and a control object controlled by the remote control apparatus.

17. The remote control apparatus as claimed in claim 1, wherein:
the communication delay is a delay of information being transmitted upstream from the control object to the remote control apparatus.

* * * * *